United States Patent
Tranninger et al.

(10) Patent No.: US 9,150,715 B2
(45) Date of Patent: Oct. 6, 2015

(54) EXTERIOR AUTOMOTIVE ARTICLE WITH REDUCED PAINTABILITY FAILURE

(75) Inventors: Michael Tranninger, Pucking (AT); Klaus Lederer, Linz (AT)

(73) Assignee: BOREALIS AG, Vienna (AT)

( * ) Notice: Subject to any disclaimer, the term of this patent is extended or adjusted under 35 U.S.C. 154(b) by 70 days.

(21) Appl. No.: 14/002,333

(22) PCT Filed: Mar. 1, 2012

(86) PCT No.: PCT/EP2012/053544
§ 371 (c)(1),
(2), (4) Date: Oct. 30, 2013

(87) PCT Pub. No.: WO2012/119921
PCT Pub. Date: Sep. 13, 2012

(65) Prior Publication Data
US 2014/0306484 A1    Oct. 16, 2014

(30) Foreign Application Priority Data

Mar. 4, 2011 (EP) .................................. 11156902

(51) Int. Cl.
| | | |
|---|---|---|
| *B62D 29/04* | (2006.01) | |
| *B32B 3/00* | (2006.01) | |
| *C08L 23/08* | (2006.01) | |
| *C08F 10/06* | (2006.01) | |
| *C08L 23/12* | (2006.01) | |
| *C08F 210/06* | (2006.01) | |

(52) U.S. Cl.
CPC ................. *C08L 23/08* (2013.01); *C08F 10/06* (2013.01); *C08L 23/12* (2013.01); *C08F 210/06* (2013.01); *C08L 2308/00* (2013.01); *C08L 2314/06* (2013.01)

(58) Field of Classification Search
CPC .. B01J 2531/48; B01J 31/0239; B01J 31/146; B01J 31/165; B01J 31/2295; C08F 10/06; C08F 10/16; C08F 2500/03; C08F 10/00; C08F 110/06; C08F 210/06; C08F 2500/20

USPC .......... 526/170, 943, 134, 16, 351, 127, 131, 526/141, 147; 502/152, 155, 117, 158, 103, 502/109, 159, 167; 296/901.01, 187.01
See application file for complete search history.

(56) References Cited

U.S. PATENT DOCUMENTS

| | | | |
|---|---|---|---|
| 3,892,691 A * | 7/1975 | White et al. .................. | 521/159 |
| 3,915,937 A * | 10/1975 | O'Shea ........................... | 528/65 |
| 6,228,795 B1 | 5/2001 | Vizzini | |
| 7,195,806 B2 * | 3/2007 | DeKunder et al. ........... | 428/35.7 |
| 8,075,830 B2 * | 12/2011 | Mier et al. .................... | 264/514 |
| 8,313,137 B2 * | 11/2012 | Goldsberry ................... | 296/191 |
| 8,313,823 B2 * | 11/2012 | Spangler et al. .............. | 428/192 |
| 2006/0009595 A1 | 1/2006 | Rix et al. | |
| 2006/0293474 A1 | 12/2006 | Brant et al. | |
| 2007/0117962 A1 * | 5/2007 | Steiger et al. ................. | 528/373 |
| 2009/0239999 A1 | 9/2009 | Canich et al. | |

FOREIGN PATENT DOCUMENTS

| | | |
|---|---|---|
| CN | 1189506 A | 8/1998 |
| EP | 0846696 A1 | 6/1998 |

OTHER PUBLICATIONS

Chinese Office Action dated Dec. 23, 2014.

\* cited by examiner

*Primary Examiner* — Glenn Dayoan
*Assistant Examiner* — Sunsurraye Westbrook
(74) *Attorney, Agent, or Firm* — Tarolli, Sundheim, Covell & Tummino LLP

(57) ABSTRACT

Exterior automotive article comprising a composition comprising a polypropylene, an elastomeric copolymer, and a mineral filler, wherein said polypropylene (PP) has a comonomer content of equal or below 1.0 wt.-%, the comonomers are ethylene and/or at least one $C_4$ to $C_{20}$ a-olefin, and <2,1> erythro regiodefects of equal or more than 0.4 mol.-%, said elastomeric copolymer (EC) comprises units derived from ethylene and at least one $C_3$ to $C_{10}$ a-olefin, said composition (C) has a melt flow rate $MFR_2$ (230° C.) in the range of 5 to 80 g/10 min.

15 Claims, No Drawings

EXTERIOR AUTOMOTIVE ARTICLE WITH REDUCED PAINTABILITY FAILURE

The present invention is directed to a new exterior automotive article and the use of a specific polypropylene in exterior automotive articles to reduce paintability failure.

Polypropylene is the material of choice in many applications as it can be tailored to specific purposes needed. For instance heterophasic polypropylenes are widely used in the automobile industry (for instance in bumper applications) as they combine good stiffness with reasonable impact strength behavior. Heterophasic polypropylenes contain a polypropylene matrix in which an amorphous phase is dispersed. The amorphous phase contains a plastomer; like a linear low density polyethylene (LLDPE), or a propylene copolymer rubber, like an ethylene propylene rubber (EPR) or an ethylene propylene diene monomer polymer (EPDM). In the case of propylene copolymer rubber the heterophasic polypropylene may contain additionally a crystalline polyethylene to some extent.

In the automotive industry such heterophasic polypropylene grades contain an amount of about 30 wt.-% amorphous phase, which normally is produced directly in one or two gas phase reactors or added externally to the matrix via a compounding step. These materials are normally used in combination with 10 to 20 wt.-% filler, like talcum, which overall leads to materials offering a good balance of stiffness and impact strength. However such materials have limited paint adhesion and thus the abrasion rate is undesirably high.

Thus the object of the present invention is to provide a material which enables a skilled person to produce molded articles with low color abrasion and good stiffness/impact balance.

The finding of the present invention is that the molded article must comprise a heterophasic polypropylene composition, wherein the matrix of said heterophasic polypropylene composition must show a reasonable number of regiodefects.

Accordingly the present invention is directed to the use of a polypropylene (PP) having (a1) a comonomer content of equal or below 1.0 wt.-%, the comonomers are ethylene and/or at least one $C_4$ to $C_{20}$ α-olefin, and (a2) <2,1> erythro regiodefects of equal or more than 0.4 mol.-% determined by $^{13}$C-NMR spectroscopy, to reduce paintability failure of a molded article, preferably to reduce paintability failure of an injection molded article.

In a preferred embodiment the polypropylene (PP) as defined above and in more detail below is used to reduce paintability failure of an automotive article, i.e. of an exterior or interior automotive article, more preferably of an exterior automotive article. Accordingly it is especially preferred that the (exterior) automotive article is a molded article, like an injection molded article.

Preferably the polypropylene (PP) is used to keep the paintability failure of the (injection) molded article, like of the (exterior) automotive article, equal or below 35%, more preferably equal below 30%, yet more preferably equal below 25%, still more preferably equal below 20%, still yet more preferably equal below 15%, like equal below 10%. Accordingly the polypropylene (PP) as defined in the instant invention is used to keep the paintability failure of the (injection) molded article, like of the (exterior) automotive article, in the range of 1 to equal or below 35%, more preferably in the range of 1 to equal or below 30%, still more preferably in the range of 2 to equal or below 25%, yet more preferably in the range of 2 to equal or below 20%, still yet more preferably in the range of 2 to equal or below 15%, like in the range of 3 to equal or below 10%. The measuring method for the paintability failure is provided in the example section.

In a preferred embodiment the polypropylene (PP) as defined herein is part of the (injection) molded article, i.e. of the (exterior) automotive article when used for reducing paintability failure. It is especially preferred that the polypropylene (PP) is part of a composition (C), which is in turn part of the (injection) molded article, i.e. part of the (exterior) automotive article.

Thus in one preferred embodiment the invention is directed to the use of the polypropylene (PP) having (a1) a comonomer content of equal or below 1.0 wt.-%, the comonomers are ethylene and/or at least one $C_4$ to $C_{20}$ α-olefin, and (a2) <2,1> erythro regiodefects of equal or more than 0.4 mol.-% determined by $^{13}$C-NMR spectroscopy, to reduce paintability failure of an (exterior) automotive article, wherein the article comprises a composition (C) comprising said polypropylene (PP), an elastomeric copolymer (EC), and a filler (F). Preferably said composition (C) has a melt flow rate $MFR_2$ (230° C.) measured according to ISO 1133 in the range of 5 to 80 g/10 min.

Concerning preferred embodiments with regard to the polypropylene (PP), the composition (C) (and its components, i.e. the polypropylene (PP), elastomeric copolymer (EC), and the mineral filler (F)) and the exterior automotive article it is referred to the information provided below.

The present invention is not only directed to the polypropylene (PP) as defined herein to reduce paintability failure, but also to an injection molded article in which the polypropylene (PP) is part of it. Accordingly the present invention is additionally directed to an automotive article, like an exterior automotive article, comprising a composition (C), said composition comprises a polypropylene (PP), an elastomeric copolymer (EC), and a mineral filler (F), wherein (a) said polypropylene (PP) has (a1) a comonomer content of equal or below 1.0 wt.-%, the comonomers are ethylene and/or at least one $C_4$ to $C_{20}$ α-olefin, and (a2) <2,1> erythro regiodefects of equal or more than 0.4 mol.-% determined by $^{13}$C-NMR spectroscopy, (b) said elastomeric copolymer (EC) comprises units derived from (b1) ethylene, and (b2) at least one $C_3$ to $C_{10}$ α-olefin, (c) said composition (C) has a melt flow rate $MFR_2$ (230° C.) measured according to ISO 1133 in the range of 5 to 80 g/10 min.

Such an automotive article, i.e. an exterior automotive article, shows excellent paintability, i.e. reduced paintability failure (see example section).

In the following the (exterior) automotive article is defined in more detail. All the information given below is also applicable for the composition (C), the polypropylene (PP), the elastomeric copolymer (EC), and the filler (F) mentioned above and discussed in the context of the use of the polypropylene (PP) to reduce paintability failure of a molded article.

The term "automotive article" used in the instant invention indicates that it is a formed three-dimensional article for the interior or exterior of automotives. Typical automotive articles are bumpers, side trims, step assists, body panels, spoilers, dashboards, interior trims and the like. The term "exterior" indicates that the article is not part of the car interior but part of the car's exterior. Accordingly preferred exterior automotive articles are selected from the group consisting of bumpers, side trims, step assists, body panels, and spoilers.

Preferably the automotive article, i.e. the exterior automotive article, comprises equal or more than 80 wt.-%, more preferably equal or more than 90 wt.-%, yet more preferably equal or more than 95 wt.-%, still more preferably equal or more than 99 wt.-%, still yet more preferably consists, of the composition (C).

Another requirement of the present invention is that the composition (C) must comprise the polypropylene (PP) and an elastomeric copolymer (EC). Further the composition (C) contains a filler (F). Accordingly in a preferred aspect of the invention the composition (C) is a heterophasic system. The expression "heterophasic" indicates that the elastomeric copolymer (EC) is (finely) dispersed in a matrix, here the polypropylene (PP). In other words the elastomeric copolymer (EC) forms inclusions in the polypropylene (PP) matrix. Thus the matrix, i.e. the polypropylene (PP), contains (finely) dispersed inclusions being not part of the matrix and said inclusions contain the elastomeric copolymer (EC). The term "inclusion" according to this invention shall preferably indicate that the matrix and the inclusion form different phases within the heterophasic system, said inclusions are for instance visible by high resolution microscopy, like electron microscopy or scanning force microscopy.

Additionally the inclusions of the composition (C) may also contain the mineral filler (F); however preferably the filler (F) forms separate inclusions within the matrix, i.e. within the polypropylene (PP).

Preferably said composition (C) comprises
(a) 36 to 85 wt.-%, preferably 45 to 72 wt.-%, of the polypropylene matrix (M-PP),
(b) 10 to 72 wt.-%, preferably 9 to 56 wt.-%, of elastomeric copolymer(s) (EP), and
(c) 5 to 20 wt.-%, preferably 8 to 15 wt.-%, of the filler (F), based on the total composition (C), more preferably based on the total sum of the polypropylene (PP), elastomeric copolymer (EC), and filler (F).

Preferably the (exterior) automotive article and/or the composition (C) is free of a polypropylene having <2,1> erythro regiodefects of below than 0.4 mol.-% determined by $^{13}$C-NMR spectroscopy and/or is free of a high density polyethylene (HDPE).

More preferably the present composition (C), i.e. said heterophasic polypropylene composition, comprises as polymer components only the polypropylene (PP) as a matrix, and the elastomeric copolymer (EC) as dispersed phase. In other words the composition (C), i.e. said heterophasic polypropylene composition, may contain further additives and the filler (F) but no other polymer in an amount exceeding 5 wt.-%, more preferably exceeding 3 wt.-%, like exceeding 1 wt.-%, based on the total composition (C). One additional polymer which may be present in such low amounts is a crystalline polyethylene which is a reaction product obtained by the preparation of one of the components used for the manufacture of the instant invention (see in detail below). Accordingly in one preferred embodiment the (exterior) automotive article and/or the composition (C) is free of any polypropylene having <2,1> erythro regiodefects of below than 0.4 mol.-% determined by $^{13}$C-NMR spectroscopy and/or is free of any high density polyethylene (HDPE). Thus is one specific preferred embodiment the (exterior) automotive article and/or the composition (C) contains as polymer components only the polypropylene (PP), the elastomeric copolymer (EC) and optionally a crystalline polyethylene in amounts as mentioned in this paragraph.

Due to the rather high amount of elastomeric copolymer (EC) within the composition (C), i.e. within said heterophasic polypropylene composition, the xylene cold soluble (XCS) content of the composition (C), i.e. of said heterophasic polypropylene composition, is also rather high, i.e. at least 12 wt.-%, more preferably in the range of 20 to 70 wt.-%, like 30 to 50 wt.-%.

Typically the composition (C), i.e. the heterophasic polypropylene composition, has a melt flow rate MFR$_2$ (230° C.) in the range of 1.0 to 80.0 g/10 min, more preferably in the range of 3.0 to 50.0 g/10 min, still more preferably in the range of 4.0 to 40.0 g/10 min.

In the following the individual components of the composition (C) will be defined in more detail.

One important compound of the polypropylene composition (C) is the polypropylene (PP). The polypropylene (PP) is featured by a rather low comonomer content. Accordingly it is preferred that the polypropylene (PP) has a comonomer content of equal or below 1.0 wt.-%, more preferably equal or below 0.8 wt.-%, yet more preferably equal or below 0.5 wt.-%.

Thus the polypropylene (PP) is preferably a random propylene copolymer (R-PP) or a propylene homopolymer (H-PP), the latter is especially preferred.

In case the polypropylene (PP) is a random propylene copolymer (R-PP) it comprises monomers copolymerizable with propylene, for example comonomers such as ethylene and/or C$_4$ to C$_{20}$ α-olefins, in particular ethylene and/or C$_4$ to C$_{10}$ α-olefins, e.g. 1-butene and/or 1-hexene. Preferably the random propylene copolymer (R-PP) comprises, especially consists of, monomers copolymerizable with propylene from the group consisting of ethylene, 1-butene and 1-hexene. More specifically the random propylene copolymer (R-PP) comprises—apart from propylene—units derivable from ethylene and/or 1-butene. In a preferred embodiment the random propylene copolymer (R-PP) comprises units derivable from ethylene and propylene only. The comonomer content in the random propylene copolymer (R-PP) is preferably in the range of more than 0.5 to 1.0 wt.-%, still more preferably in the range of more than 0.5 to 0.8 wt.-%.

The expression homopolymer used in the instant invention relates to a polypropylene that consists substantially, i.e. of equal or more than 99.5 wt.-%, more preferably of at least 99.8 wt.-%, of propylene units. In a preferred embodiment only propylene units in the propylene homopolymer (H-PP) are detectable. The comonomer content can be determined with $^{13}$C-NMR spectroscopy, as described below in the examples.

The term "random copolymer" indicates that the comonomers within the propylene copolymer (PP) are randomly distributed. The randomness defines the amount of isolated comonomer units, i.e. those which have no neighbouring comonomer units, compared to the total amount of comonomers in the polymer chain.

Preferably the polypropylene (PP) is highly isotactic. Accordingly it is appreciated that polypropylene (PP) has a rather rather high pentad concentration, i.e. higher than 90%, more preferably higher than 92%, still more preferably higher than 93% and yet more preferably higher than 95%, like higher than 99%.

A further important characteristic of the polypropylene (PP) is that it is preferably produced by a single-site catalyst. Polypropylenes produced by single-site catalyst are inter alia featured by a rather high amount of regio misinsertions of propylene within the polymer chain. Accordingly the polypropylene (PP) is featured by a high amount of <2,1> erythro regiodefects, i.e. of more than 0.1 mol.-%, more preferably of equal or more than 0.2 mol.-%, yet more preferably of equal or more than 0.4 mol.-%, still more preferably of equal or more than 0.6 mol.-%, like in the range of 0.4 to 1.0 mol.-% or 0.5 to 0.95 mol.-%, determined by $^{13}$C-NMR spectroscopy.

Further the polypropylene (PP) is featured by rather low xylene cold soluble (XCS) content, i.e. by a xylene cold soluble (XCS) content of equal or below 1.5 wt.-%, more preferably of equal or below 1.3 wt.-%, yet more preferably equal or below 1.0 wt.-%, like equal or below 0.8 wt.-%. Thus it is in particular appreciated that the polypropylene (PP) of the instant invention has a xylene cold soluble (XCS) content in the range of 0.1 to equal or below 1.5 wt.-%, more preferably in the range of 0.1 to equal or below 1.0 wt.-%, yet more preferably in the range of 0.2 to equal or below 1.0 wt.-%, like in the range of 0.2 to equal or below 0.8 wt.-%.

A further characteristic of the polypropylene (PP) is the melting behaviour. Accordingly it is appreciated that the polypropylene (PP) has a melting temperature ($T_m$) measured by differential scanning calorimetry (DSC) of at least 150.0° C., more preferably of at least 152° C. Thus it is in particular appreciated that the melting temperature ($T_m$) measured by differential scanning calorimetry (DSC) of the polypropylene (PP) is in the range of 150 to 160° C., more preferably in the range of 150 to 158° C., and yet more preferably in the range of 151 to 155° C.

Further it is appreciated that the polypropylene (PP) has crystallization temperature ($T_c$) measured by differential scanning calorimetry (DSC) of at least 100° C., more preferably of at least 105° C. Accordingly the polypropylene (PP) has preferably a crystallization temperature ($T_c$) measured by differential scanning calorimetry (DSC) in the range of 100 to 115° C., more preferably in the range of 105 to 112° C.

The molecular weight distribution (MWD) is the relation between the numbers of molecules in a polymer and the individual chain length. The molecular weight distribution (MWD) is expressed as the ratio of weight average molecular weight ($M_w$) and number average molecular weight ($M_n$). The number average molecular weight ($M_n$) is an average molecular weight of a polymer expressed as the first moment of a plot of the number of molecules in each molecular weight range against the molecular weight. In effect, this is the total molecular weight of all molecules divided by the number of molecules. In turn, the weight average molecular weight ($M_w$) is the first moment of a plot of the weight of polymer in each molecular weight range against molecular weight.

The number average molecular weight ($M_n$) and the weight average molecular weight ($M_w$) as well as the molecular weight distribution (MWD) are determined by gel permeation chromatography (GPC) (ISO 16014-4 2003).

Accordingly it is preferred that the polypropylene (PP) has a weight average molecular weight ($M_w$) from 100 to 600 kg/mol, more preferably from 200 to 500 kg/mol.

The number average molecular weight ($M_n$) of the polypropylene (PP) is preferably in the range of 5 to 400 kg/mol, more preferably from 10 to 300 kg/mol.

A broad molecular weight distribution (MWD) improves the processability of the polypropylene (PP). Accordingly it is appreciated that the molecular weight distribution (MWD) measured according to ISO 16014-4 2003 of polypropylene (PP) is at least 2.0, more preferably at least 2.2, yet more preferably between 2.0 to equal or below 7.0, still more preferably in the range of 2.0 to 5.0, like 2.2 to 5.0.

Furthermore, it is preferred that the polypropylene (PP) has a melt flow rate (MFR) given in a specific range. The melt flow rate measured under a load of 2.16 kg at 230° C. (ISO 1133) is denoted as $MFR_2$ (230° C.). Accordingly, it is preferred that the polypropylene (PP) has an $MFR_2$ (230° C.) of more than 1.3 g/10 min, more preferably of more than 1.5 g/10 min. Accordingly it is appreciated that the $MFR_2$ (230° C.) measured according to ISO 1133 of the polypropylene (PP) is in the range of 1.3 to 10.0 g/10 min, more preferably in the range of 1.5 to 6.0 g/10 min, like in the range of 1.6 to 5.0 g/10 min.

Further it is appreciated that the polypropylene (PP) is of linear structure and thus does not show (or nearby does not show) a kind of branching. Accordingly it is appreciated that the polypropylene (PP) has preferably a branching index g' of not less than 0.9, preferably more than 0.9, like at least 0.95. In other words if the polypropylene (PP) has some kind of branching it shall be rather moderate. Accordingly the branching index g' of the polypropylene (PP) is preferably in the range of 0.9 to 1.0, more preferably in the range of more than 0.9 to 1.0, like in the range of 0.96 to 1.0. In an especially preferred embodiment the polypropylene (PP) shows no branching, i.e. the polypropylene (PP) has a branching index g' of 1.0. A low g'-value is an indicator for a high branched polymer. In other words, if the g'-value decreases, the branching of the polypropylene increases. The exact determination of the g'-value is specified in the example section.

As a further component an elastomeric component, i.e. an elastomeric copolymer (EC) must be present within the composition (C). The elastomeric copolymer (EC) according to this invention must comprise units derived from (a1) ethylene, and (a2) at least one $C_3$ to $C_{10}$ α-olefin.

The elastomeric copolymer (EC) can be one specific polymer or a mixture of two or more different polymers. Accordingly in a preferred embodiment the elastomeric copolymer (EC) is (a) a first elastomeric copolymer (EC1) comprising units derived from ethylene and at least one $C_3$ to $C_{10}$ α-olefin, preferably comprising units derived from ethylene, propylene and optionally at least one $C_3$ to $C_{10}$ α-olefin,
wherein said first elastomeric copolymer (EC1) preferably comprises ethylene in an amount of 20 to 70 wt.-%, or (b) a second elastomeric copolymer (EC2) comprising units derived from ethylene and at least one $C_3$ to $C_{10}$ α-olefin, preferably being a linear low density polyethylene (LLDPE),
wherein said second elastomeric copolymer (EC2), i.e. the linear low density polyethylene (LLDPE), preferably comprises units derived from ethylene in an amount of more than 50 wt.-%, or (c) a mixture of the first elastomeric copolymer (EC1) and the second elastomeric copolymer (EC2), wherein the first elastomeric copolymer (EC1) and the second elastomeric copolymer (EC2) are chemically different.

Preferably the first elastomeric copolymer (EC1) comprises, preferably consists of, units derivable from ethylene and at least another $C_3$ to $C_{20}$ α-olefin, like $C_3$ to $C_{10}$ α-olefin, more preferably units derivable from ethylene and at least another α-olefin selected form the group consisting of propylene, 1-butene, 1-pentene, 1-hexene, 1-heptene and 1-octene. The elastomeric copolymer (EC1) may additionally contain units derived from a non-conjugated diene, however it is preferred that the first elastomeric copolymer (EC1) consists of units derivable from ethylene and propylene and optionally $C_4$ to $C_{20}$ α-olefins only. Suitable non-conjugated dienes, if used, include straight-chain and branched-chain acyclic dienes, such as 1,4-hexadiene, 1,5-hexadiene, 1,6-octadiene, 5-methyl-1,4-hexadiene, 3,7-dimethyl-1,6-octadiene, 3,7-dimethyl-1,7-octadiene, and the mixed isomers of dihydromyrcene and dihydro-ocimene, and single ring alicyclic dienes such as 1,4-cyclohexadiene, 1,5-cyclooctadiene, 1,5-cyclododecadiene, 4-vinyl cyclohexene, 1-allyl-4-isopropylidene cyclohexane, 3-allyl cyclopentene, 4-cyclohexene and 1-isopropenyl-4-(4-butenyl)cyclohexane. Multi-ring alicyclic fused and bridged ring dienes are also suitable including tetrahydroindene, methyltetrahydroindene, dicyclopentadiene, bicyclo(2,2,1)hepta-2,5-diene, 2-methyl bicycloheptadiene, and alkenyl, alkylidene, cycloalkenyl and cycloalkylidene norbornenes, such as 5-methylene-2-norbornene, 5-isopropylidene norbornene, 5-(4-cyclopentenyl)-2-norbornene; and 5-cyclohexylidene-2-norbornene. Preferred non-conjugated dienes are 5-ethylidene-2-norbornene, 1,4-hexadiene and dicyclopentadiene.

Accordingly the first elastomeric copolymer (EC1) comprises at least units derivable from ethylene and propylene and may comprise other units derivable from a further α-olefin as defined in the previous paragraph. However it is in particular preferred that the first elastomeric copolymer (EC1) comprises units only derivable from ethylene and propylene and optionally a non-conjugated diene as defined in the previous paragraph, like 1,4-hexadiene. Thus an ethylene propylene non-conjugated diene monomer polymer (EPDM) and/or an ethylene propylene rubber (EPR) as the first elastomeric copolymer (EC1) is especially preferred, the latter most preferred.

The content of units derivable from ethylene in the first elastomeric copolymer (EC1) is more than 20.0 wt.-%, more preferably ranges from 20.0 to 70.0 wt.-%, more preferably 30.0 to 60.0 wt.-%. Preferably the first elastomeric copolymer (EC1) with an ethylene content as defined in this paragraph is an ethylene propylene non conjugated diene monomer polymer (EPDM) or an ethylene propylene rubber (EPR), the latter especially preferred.

Further the density measured according to ISO 1183 of the first elastomeric copolymer (EC1) shall preferably not exceed 900 kg/m$^3$, more preferably shall be in the range 850 to 900 kg/m$^3$, still more preferably in the range of 855 to 875 kg/m$^3$.

The first elastomeric copolymer (EC1) may be produced by conventional solution or gas phase α-olefin polymerization techniques with homogeneous or heterogeneous catalysts. It is especially preferred that the first elastomeric copolymer (EC1) is produced in a continuous process after production of the polypropylene (PP) as described in detail below.

The second elastomeric copolymer (EC2) is preferably a linear low density polyethylene (LLDPE). Accordingly the second elastomeric copolymer (EC2), i.e. the linear low density polyethylene (LLDPE), has a density measured according to ISO 1183-187 in the range 820 to 900 kg/m$^3$, more preferably in the range of 850 to 900 kg/m$^3$, yet more preferably in the range of 840 to 880 kg/m$^3$, like in the range of 860 to 885 kg/m$^3$.

Further the second elastomeric copolymer (EC2), i.e. the linear low density polyethylene (LLDPE), is featured by a specific melt flow rate, namely by a melt flow rate MFR$_2$ (190° C.) measured according to ISO 1133 in the range of 3.0 to 15.0 g/10 min, more preferably in the range of 4.0 to 10.0 g/10 min.

Preferably the second elastomeric copolymer (EC2), i.e. the linear low density polyethylene (LLDPE), is a copolymer containing as a major part units derivable from ethylene. Accordingly it is appreciated that second elastomeric copolymer (EC2), i.e. the linear low density polyethylene (LLDPE), comprises at least 50.0 wt.-% units derivable from ethylene, more preferably at least 55.0 wt.-% of units derived from ethylene. Thus it is appreciated that the second elastomeric copolymer (EC2), i.e. the linear low density polyethylene (LLDPE), comprises 50.0 to 70.0 wt.-%, more preferably 55.0 to 65 wt.-%, units derivable from ethylene. The comonomers present in the second elastomeric copolymer (EC2), i.e. the linear low density polyethylene (LLDPE), are $C_4$ to $C_{20}$ α-olefins, like 1-butene, 1-hexene and 1-octene, 1-butene especially preferred. Accordingly in one specific embodiment the second elastomeric copolymer (EC2), i.e. the linear low density polyethylene (LLDPE), is an ethylene-1-octene polymer or ethylene-1-butene polymer with the amounts given in this paragraph, the latter being preferred.

As a further requirement the present composition requires the presence of a mineral filler (F). Preferably the mineral filler (F) is a phyllosilicate, mica or wollastonite. Even more preferred the mineral filler (F) is selected from the group consisting of mica, wollastonite, kaolinite, smectite, montmorillonite and talc. The most preferred the mineral filler (F) is talc.

The mineral filler (F) preferably has a particle size (d97%) of below 10.0 μm (d97% indicates that 97 wt-% of the filler has a particle size below 10.0 μm), more preferably below 7.0 μm.

Typically the mineral filler (F) has a surface area measured according to the commonly known BET method with $N_2$ gas as analysis adsorptive of less than 20 m$^2$/g, more preferably in the range of 12 to 20 m$^2$/g, yet more preferably of 12 to 18 m$^2$/g.

The instant composition may additional contain typical other additives useful in the automobile sector, like carbon black, other pigments, antioxidants, UV stabilizers, nucleating agents, antistatic agents and slip agents, in amounts usual in the art.

In the following the preparation of the polymer components are described in more detail.

The polypropylene (PP) of this invention has been preferably produced in the presence of a single-site catalyst, in particular in the presence of a metallocene catalyst, like a metallocene catalyst of formula (I)

wherein

"M" is zirconium (Zr) or hafnium (Hf), preferably zirconium (Zr), each "X" is independently a monovalent anionic σ-ligand, each "Cp'" is a cyclopentadienyl-type organic ligand independently selected from the group consisting of substituted cyclopentadienyl, substituted indenyl, substituted tetrahydroindenyl, and substituted or unsubstituted fluorenyl, said organic ligands coordinate to the transition metal (M), "R" is a bivalent bridging group linking said organic ligands (Cp'), and "n" is 1 or 2, preferably 1.

Accordingly the present invention is also directed to a process for the preparation of the (exterior) automotive article comprising the composition (C). The process for the preparation of the (exterior) automotive article or the composition (C) comprises (A) the step of the preparation of the polypropylene (PP) by polymerizing propylene and optionally ethylene and/or at least one $C_4$ to $C_{20}$ α-olefin in at least one reactor, preferably in at least two reactors, i.e. two reactors, more preferably first in a loop reactor and subsequently in a gas phase reactor, and in the presence of a solid catalyst system, said solid catalyst system comprises (i) a transition metal compound of formula (I)

wherein

"M" is zirconium (Zr) or hafnium (Hf), preferably zirconium (Zr), each "X" is independently a monovalent anionic σ-ligand, each "Cp'" is a cyclopentadienyl-type organic ligand independently selected from the group consisting of substituted cyclopentadienyl, substituted indenyl, substituted tetrahydroindenyl, and substituted or unsubstituted fluorenyl, said organic ligands coordinate to the transition metal (M), "R" is a bivalent bridging group linking said organic ligands (Cp'), and "n" is 1 or 2, preferably 1, and (ii) optionally a cocatalyst comprising an element of group 13 of the periodic table (IUPAC), preferably a cocatalyst comprising a compound of Al, (B1)

(B1.1) removing said polypropylene (PP) from the reactor system, and (B1.2) transferring it to an mixing device, preferably to an extruder or to an injection molding device mixing said polypropylene (PP) with the elastomeric copolymer (EC), i.e. the first elastomeric copolymer (EC1) and/or the second elastomeric copolymer (EC2), and the filler (F), obtaining thereby the composition (C) or the (exterior) automotive article, or (B2)

(B2.1) transferring said polypropylene (PP) in a further reactor, preferably a gas phase reactor, (B2.2) producing the elastomeric copolymer (EC1) by polymerizing ethylene and further $C_3$ to $C_{10}$ α-olefins, preferably propylene, in the presence of said polypropylene (PP) to obtain the elastomeric copolymer (EC1) dispersed in said polypropylene (PP), i.e. leading to the heterophasic polypropylene composition, (B2.3) removing said mixture of polypropylene (PP) elastomeric copolymer (EC1), i.e. removing the heterophasic polypropylene composition, from the reactor system, and (B2.4) transferring it to an mixing device, preferably to an extruder or to an injection molding device mixing the elastomeric copolymer (EC), i.e. the first elastomeric copolymer (EC1) and/or the second elastomeric copolymer (EC2), and the filler (F) with the polypropylene (PP), obtaining thereby the composition (C) or the (exterior) automotive article.

All reactors of steps are preferably connected in series.

Preferably, in the process for producing the polypropylene (PP) as defined above the conditions for step (A) in first reactor, i.e. the loop reactor, may be as follows:

the temperature is within the range of 40° C. to 110° C., preferably between 60° C. and 100° C., 70 to 90° C., the pressure is within the range of 20 bar to 80 bar, preferably between 30 bar to 60 bar, hydrogen can be added for controlling the molar mass in a manner known per se.

The process conditions of step (A) in the second reactor, i.e. the first gas phase reactor, and/or in step (B2.2), i.e. the (second) gas phase reactor, are preferably as follows:

the temperature is within the range of 50° C. to 130° C., preferably between 60° C. and 100° C., the pressure is within the range of 5 bar to 50 bar, preferably between 15 bar to 35 bar, hydrogen can be added for controlling the molar mass in a manner known per se.

If desired, the polymerization may be effected in a known manner under supercritical conditions in the bulk, preferably loop reactor, and/or as a condensed mode in the gas phase reactor.

In one specific embodiment the polypropylene (PP) is in particular obtainable, more preferably obtained, by a solid catalyst system comprising the metallocene of formula (I), said catalyst system has a surface of lower than 15 m$^2$/g, still lower than 10 m$^2$/g and most preferred lower than 5 m$^2$/g, which is the lowest measurement limit. The surface area according to this invention is measured according to ASTM D 3663 ($N_2$).

Alternatively or additionally it is appreciated that said solid catalyst system has a porosity of less than 1.30 ml/g and more preferably less than 1.00 ml/g. The porosity has been measured according to ASTM 4641 ($N_2$). In another preferred embodiment the porosity is not detectable when determined with the method applied according to ASTM 4641 ($N_2$).

Furthermore said solid catalyst system typically has a mean particle size of not more than 500 μm, i.e. preferably in the range of 2 to 500 μm, more preferably 5 to 200 μm. It is in particular preferred that the mean particle size is below 80 μm, still more preferably below 70 μm. A preferred range for the mean particle size is 5 to 70 μm, or even 10 to 60 μm.

As stated above the transition metal (M) is zirconium (Zr) or hafnium (Hf), preferably zirconium (Zr).

The term "σ-ligand" is understood in the whole description in a known manner, i.e. a group bound to the metal via a sigma bond. Thus the anionic ligands "X" can independently be halogen or be selected from the group consisting of R', OR', SiR'$_3$, OSiR'$_3$, OSO$_2$CF$_3$, OCOR', SR', NR'$_2$ or PR'$_2$ group wherein R' is independently hydrogen, a linear or branched, cyclic or acyclic, $C_1$ to $C_{20}$ alkyl, $C_2$ to $C_{20}$ alkenyl, $C_2$ to $C_{20}$ alkynyl, $C_3$ to $C_{12}$ cycloalkyl, $C_6$ to $C_{20}$ aryl, $C_7$ to $C_{20}$ arylalkyl, $C_7$ to $C_{20}$ alkylaryl, $C_8$ to $C_{20}$ arylalkenyl, in which the R' group can optionally contain one or more heteroatoms belonging to groups 14 to 16. In a preferred embodiments the anionic ligands "X" are identical and either halogen, like Cl, or methyl or benzyl.

A preferred monovalent anionic ligand is halogen, in particular chlorine (Cl).

The substituted cyclopentadienyl-type ligand(s) may have one or more substituent(s) being selected from the group consisting of halogen, hydrocarbyl (e.g. $C_1$ to $C_{20}$ alkyl, $C_2$ to $C_{20}$ alkenyl, $C_2$ to $C_{20}$ alkynyl, $C_3$ to $C_{20}$ cycloalkyl, like $C_1$ to $C_{20}$ alkyl substituted $C_5$ to $C_{20}$ cycloalkyl, $C_6$ to $C_{20}$ aryl, $C_5$ to $C_{20}$ cycloalkyl substituted $C_1$ to $C_{20}$ alkyl wherein the cycloalkyl residue is substituted by $C_1$ to $C_{20}$ alkyl, $C_7$ to $C_{20}$ arylalkyl, $C_3$ to $C_{12}$ cycloalkyl which contains 1, 2, 3 or 4 heteroatom(s) in the ring moiety, $C_6$ to $C_{20}$-heteroaryl, $C_1$ to $C_{20}$-haloalkyl, —SiR"$_3$, —SR", —PR"$_2$ or —NR"$_2$, each R" is independently a hydrogen or hydrocarbyl (e.g. $C_1$ to $C_{20}$ alkyl, $C_1$ to $C_{20}$ alkenyl, $C_2$ to $C_{20}$ alkynyl, $C_3$ to $C_{12}$ cycloalkyl, or $C_6$ to $C_{20}$ aryl) or e.g. in case of —NR"$_2$, the two substituents R" can form a ring, e.g. five- or six-membered ring, together with the nitrogen atom wherein they are attached to.

Further "R" of formula (I) is preferably a bridge of 1 to 4 atoms, such atoms being independently carbon (C), silicon (Si), germanium (Ge) or oxygen (O) atom(s), whereby each of the bridge atoms may bear independently substituents, such as $C_1$ to $C_{20}$-hydrocarbyl, tri($C_1$ to $C_{20}$-alkyl)silyl, tri($C_1$ to $C_{20}$-alkyl)siloxy and more preferably "R" is a one atom bridge like e.g. —SiR'''$_2$—, wherein each R''' is independently $C_1$ to $C_{20}$-alkyl, $C_2$ to $C_{20}$-alkenyl, $C_2$ to $C_{20}$-alkynyl, $C_3$ to $C_{12}$ cycloalkyl, $C_6$ to $C_{20}$-aryl, alkylaryl or arylalkyl, or tri($C_1$ to $C_{20}$ alkyl)silyl-residue, such as trimethylsilyl-, or the two R''' can be part of a ring system including the Si bridging atom.

In a preferred embodiment the metallocene catalyst, i.e. the transition metal compound, has the formula (II)

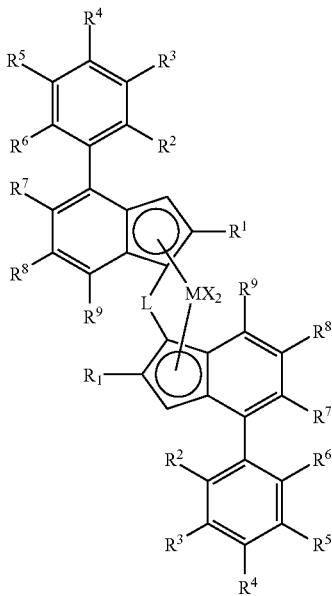

wherein

M is zirconium (Zr) or hafnium (Hf), preferably zirconium (Zr),

X are ligands with a σ-bond to the metal "M", preferably those as defined above for formula (I),
  preferably chlorine (Cl) or methyl ($CH_3$), the former especially preferred, $R^1$ are equal to or different from each other, preferably equal to, and are selected from the group consisting of linear saturated $C_1$ to $C_{20}$ alkyl, linear unsaturated $C_1$ to $C_{20}$ alkyl, branched saturated $C_1$-$C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, and $C_7$ to $C_{20}$ arylalkyl, optionally containing one or more heteroatoms of groups 14 to 16 of the Periodic Table (IUPAC), preferably are equal to or different from each other, preferably equal to, and are $C_1$ to $C_{10}$ linear or branched hydrocarbyl, more preferably are equal to or different from each other, preferably equal to, and are $C_1$ to $C_6$ linear or branched alkyl, $R^2$ to $R^6$ are equal to or different from each other and are selected from the group consisting of hydrogen, linear saturated $C_1$-$C_{20}$ alkyl, linear unsaturated $C_1$-$C_{20}$ alkyl, branched saturated $C_1$-$C_{20}$ alkyl, branched unsaturated $C_1$-$C_{20}$ alkyl, $C_3$-$C_{20}$ cycloalkyl, $C_6$-$C_{20}$ aryl, $C_7$-$C_{20}$ alkylaryl, and $C_7$-$C_{20}$ arylalkyl, optionally containing one or more heteroatoms of groups 14 to 16 of the Periodic Table (IUPAC),
  preferably are equal to or different from each other and are $C_1$ to $C_{10}$ linear or branched hydrocarbyl, more preferably are equal to or different from each other and are $C_1$ to $C_6$ linear or branched alkyl, $R^7$ and $R^8$ are equal to or different from each other and selected from the group consisting of hydrogen, linear saturated $C_1$ to $C_{20}$ alkyl, linear unsaturated $C_1$ to $C_{20}$ alkyl, branched saturated $C_1$ to $C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, $C_7$ to $C_{20}$ arylalkyl, optionally containing one or more heteroatoms of groups 14 to 16 of the Periodic Table (IUPAC), $SiR^{10}_3$, $GeR^{10}_3$, $OR^{10}$, $SR^{10}$ and $NR^{10}_2$,
  wherein
  $R^{10}$ is selected from the group consisting of linear saturated $C_1$-$C_{20}$ alkyl, linear unsaturated $C_1$ to $C_{20}$ alkyl, branched saturated $C_1$ to $C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, and $C_7$ to $C_{20}$ arylalkyl, optionally containing one or more heteroatoms of groups 14 to 16 of the Periodic Table (IUPAC),
  and/or
  $R^7$ and $R^8$ being optionally part of a $C_4$ to $C_{20}$ carbon ring system together with the indenyl carbons to which they are attached, preferably a $C_5$ ring, optionally one carbon atom can be substituted by a nitrogen, sulfur or oxygen atom, $R^9$ are equal to or different from each other and are selected from the group consisting of hydrogen, linear saturated $C_1$ to $C_{20}$ alkyl, linear unsaturated $C_1$ to $C_{20}$ alkyl, branched saturated $C_1$ to $C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, $C_7$ to $C_{20}$ arylalkyl, $OR^{10}$, and $SR^{10}$,
  preferably $R^9$ are equal to or different from each other and are H or $CH_3$, wherein
  $R^{10}$ is defined as before, L is a bivalent group bridging the two indenyl ligands, preferably being a $C_2R^{11}_4$ unit or a $SiR^{11}_2$ or $GeR^{11}_2$, wherein,
  $R^{11}$ is selected from the group consisting of H, linear saturated $C_1$ to $C_{20}$ alkyl, linear unsaturated $C_1$ to $C_{20}$ alkyl, branched saturated $C_1$ to $C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl or $C_7$ to $C_{20}$ arylalkyl, optionally containing one or more heteroatoms of groups 14 to 16 of the Periodic Table (IUPAC),
  preferably $Si(CH_3)_2$, $SiCH_3C_6H_{11}$, or $SiPh_2$,
  wherein $C_6H_{11}$ is cyclohexyl.

Preferably the transition metal compound of formula (II) is $C_2$-symmetric or pseudo-$C_2$-symmetric. Concerning the definition of symmetry it is referred to Resconi et al. Chemical Reviews, 2000, Vol. 100, No. 4 1263 and references herein cited.

Preferably the residues $R^1$ are equal to or different from each other, more preferably equal, and are selected from the group consisting of linear saturated $C_1$ to $C_{10}$ alkyl, linear unsaturated $C_1$ to $C_{10}$ alkyl, branched saturated $C_1$ to $C_{10}$ alkyl, branched unsaturated $C_1$ to $C_{10}$ alkyl and $C_7$ to $C_{12}$ arylalkyl. Even more preferably the residues $R^1$ are equal to or different from each other, more preferably equal, and are selected from the group consisting of linear saturated $C_1$ to $C_6$ alkyl, linear unsaturated $C_1$ to $C_6$ alkyl, branched saturated $C_1$ to $C_6$ alkyl, branched unsaturated $C_1$ to $C_6$ alkyl and $C_7$ to $C_{10}$ arylalkyl. Yet more preferably the residues $R^1$ are equal to or different from each other, more preferably equal, and are selected from the group consisting of linear or branched $C_1$ to $C_4$ hydrocarbyl, such as for example methyl or ethyl.

Preferably the residues $R^2$ to $R^6$ are equal to or different from each other and linear saturated $C_1$ to $C_4$ alkyl or branched saturated $C_1$ to $C_4$ alkyl. Even more preferably the residues $R^2$ to $R^6$ are equal to or different from each other, more preferably equal, and are selected from the group consisting of methyl, ethyl, iso-propyl and tert-butyl.

Preferably $R^7$ and $R^8$ are equal to or different from each other and are selected from hydrogen and methyl, or they are part of a 5-methylene ring including the two indenyl ring carbons to which they are attached. In another preferred embodiment, $R^7$ is selected from $OCH_3$ and $OC_2H_5$, and $R^8$ is tert-butyl.

In a preferred embodiment the transition metal compound is rac-methyl(cyclohexyl)silanediyl bis(2-methyl-4-(4-tert-butylphenyl)indenyl)zirconium dichloride.

Preferably said solid catalyst system comprises additionally a cocatalyst comprising an element of group 13 of the periodic table (IUPAC), for instance the cocatalyst comprises a compound of Al.

Examples of such cocatalyst are organo aluminium compounds, such as aluminoxane compounds.

Such compounds of Al, preferably aluminoxanes, can be used as the only compound in the cocatalyst or together with other cocatalyst compound(s). Thus besides or in addition to the compounds of Al, i.e. the aluminoxanes, other cation complex forming cocatalyst compounds, like boron compounds can be used. Said cocatalysts are commercially available or can be prepared according to the prior art literature. Preferably however in the manufacture of the solid catalyst system only compounds of Al as cocatalyst are employed.

In particular preferred cocatalysts are the aluminoxanes, in particular the C1 to C10-alkylaluminoxanes, most particularly methylaluminoxane (MAO).

Preferably, the organo-zirconium compound of formula (I) (or formula (II)) and the cocatalyst of the solid catalyst system represent at least 70 wt %, more preferably at least 80 wt %, even more preferably at least 90 wt %, even further preferably at least 95 wt % of the solid catalyst system. Thus it is appreciated that the solid catalyst system is featured by the fact that it is self-supported, i.e. it does not comprise any catalytically inert support material, like for instance silica, alumina or $MgCl_2$ or porous polymeric material, which is otherwise commonly used in heterogeneous catalyst systems, i.e. the catalyst is not supported on external support or carrier material. As a consequence of that the solid catalyst system is self-supported and it has a rather low surface area.

In one embodiment the solid metallocene catalyst system is obtained by the emulsion solidification technology, the basic principles of which are described in WO 03/051934. This document is herewith included in its entirety by reference.

Hence the solid catalyst system is preferably in the form of solid catalyst particles, obtainable by a process comprising the steps of
a) preparing a solution of one or more catalyst components;
b) dispersing said solution in a second solvent to form an emulsion in which said one or more catalyst components are present in the droplets of the dispersed phase,
c) solidifying said dispersed phase to convert said droplets to solid particles and optionally recovering said particles to obtain said catalyst.

Preferably a first solvent, more preferably a first organic solvent, is used to form said solution. Still more preferably the organic solvent is selected from the group consisting of a linear alkane, cyclic alkane, aromatic hydrocarbon and halogen-containing hydrocarbon.

Moreover the second solvent forming the continuous phase is an inert solvent towards to catalyst components, The second solvent might be immiscible towards the solution of the catalyst components at least under the conditions (like temperature) during the dispersing step. The term "immiscible with the catalyst solution" means that the second solvent (continuous phase) is fully immiscible or partly immiscible i.e. not fully miscible with the dispersed phase solution.

Preferably the immiscible solvent comprises a fluorinated organic solvent and/or a functionalized derivative thereof, still more preferably the immiscible solvent comprises a semi-, highly- or perfluorinated hydrocarbon and/or a functionalized derivative thereof. It is in particular preferred, that said immiscible solvent comprises a perfluorohydrocarbon or a functionalized derivative thereof, preferably $C_3$-$C_{30}$ perfluoroalkanes, -alkenes or -cycloalkanes, more preferred $C_4$-$C_{10}$ perfluoro-alkanes, -alkenes or -cycloalkanes, particularly preferred perfluorohexane, perfluoroheptane, perfluorooctane or perfluoro (methylcyclohexane) or perfluoro (1,3-dimethylcyclohexane) or a mixture thereof.

Furthermore it is preferred that the emulsion comprising said continuous phase and said dispersed phase is a bi- or multiphasic system as known in the art. An emulsifier may be used for forming and stabilising the emulsion. After the formation of the emulsion system, said catalyst is formed in situ from catalyst components in said solution.

In principle, the emulsifying agent may be any suitable agent which contributes to the formation and/or stabilization of the emulsion and which does not have any adverse effect on the catalytic activity of the catalyst. The emulsifying agent may e.g. be a surfactant based on hydrocarbons optionally interrupted with (a) heteroatom(s), preferably halogenated hydrocarbons optionally having a functional group, preferably semi-, highly- or perfluorinated hydrocarbons as known in the art. Alternatively, the emulsifying agent may be prepared during the emulsion preparation, e.g. by reacting a surfactant precursor with a compound of the catalyst solution. Said surfactant precursor may be a halogenated hydrocarbon with at least one functional group, e.g. a highly fluorinated C1-n (suitably C4-30- or C5-15) alcohol (e.g. highly fluorinated heptanol, octanol or nonanol), oxide (e.g. propenoxide) or acrylate ester which reacts e.g. with a cocatalyst component, such as aluminoxane to form the "actual" surfactant.

In principle any solidification method can be used for forming the solid particles from the dispersed droplets. According to one preferable embodiment the solidification is effected by a temperature change treatment. Hence the emulsion subjected to gradual temperature change of up to 10° C./min, preferably 0.5 to 6° C./min and more preferably 1 to 5° C./min. Even more preferred the emulsion is subjected to a temperature change of more than 40° C., preferably more than 50° C. within less than 10 seconds, preferably less than 6 seconds.

For further details, embodiments and examples of the continuous and dispersed phase system, emulsion formation method, emulsifying agent and solidification methods reference is made e.g. to the above cited international patent application WO 03/051934.

All or part of the preparation steps can be done in a continuous manner. Reference is made to WO 2006/069733 describing principles of such a continuous or semicontinuous preparation methods of the solid catalyst types, prepared via emulsion/solidification method.

The above described catalyst components are prepared according to the methods described in WO 01/48034.

The elastomeric copolymer (EC2), i.e. the linear low density polyethylene (LLDPE), can be manufactured in a slurry loop reactor using a single site catalyst, e.g. metallocene catalyst. Suitable metallocenes and ways of preparing them are within the knowledge and skills of a person skilled in the field. Reference is made to EP 0 260 130, WO 97/28170, WO 98/46616, WO 98/49208, WO 99/12981, WO 99/19335, EP 0 836 608, WO 98/56831, WO 00/34341, EP 0 423101 and EP 0 537 130. Especially preferred the elastomeric copolymer (EC2), i.e. the linear low density polyethylene (LLDPE), is made using a hafnium metallocene such as a bis(n-butylcyclopentadienyl) hafnium dichloride or a bis(n-butylcyclopentadienyl) hafnium dibenzyl. Other potential catalysts are described in WO 97/28170 and WO 00/40620

For slurry reactors, the reaction temperature will generally be in the range 60 to 110° C. (e.g. 85 to 110° C.), the reactor pressure will generally be in the range 5 to 80 bar (e.g. 50 to 65 bar), and the residence time will generally be in the range 0.3 to 5 hours (e.g. 0.5 to 2 hours). The diluent used will generally be an aliphatic hydrocarbon having a boiling point in the range −70 to +100° C. In such reactors, polymerisation may if desired be effected under supercritical conditions. Preferably, the elastomeric copolymer (EC2), i.e. the linear low density polyethylene (LLDPE), is produced in a continuously operating loop reactor where ethylene is polymerised in the presence of a polymerisation catalyst as stated above and a chain transfer agent such as hydrogen. The diluent is typically an inert aliphatic hydrocarbon, preferably isobutane or propane. The elastomeric copolymer (EC2), i.e. the linear low density polyethylene (LLDPE), may contain various standard polymer additives such as antioxidants, UV stabilisers and polymer processing agents.

For mixing the individual components of the instant composition, a conventional compounding or blending apparatus, e.g. a Banbury mixer, a 2-roll rubber mill, Buss-co-kneader or a twin screw extruder may be used. The polymer materials recovered from the extruder are usually in the form of pellets. These pellets are then preferably further processed, e.g. by injection molding to generate the articles, i.e. the (exterior) automotive articles.

The present invention will now be described in further detail by the examples provided below.

EXAMPLES

A. Measuring Methods

The following definitions of terms and determination methods apply for the above general description of the invention as well as to the below examples unless otherwise defined.

Quantification of Microstructure by NMR Spectroscopy

Quantitative nuclear-magnetic resonance (NMR) spectroscopy was used to quantify the isotacticity, regio-regularity and comonomer content of the polymers.

Quantitative $^{13}C\{^{1}H\}$ NMR spectra were recorded in the solution-state using a Bruker Advance III 400 NMR spectrometer operating at 400.15 and 100.62 MHz for $^{1}H$ and $^{13}C$ respectively. All spectra were recorded using a $^{13}C$ optimised 10 mm extended temperature probehead at 125° C. using nitrogen gas for all pneumatics.

For polypropylene homopolymers approximately 200 mg of material was dissolved in 1,2-tetrachloroethane-$d_2$ (TCE-$d_2$). To ensure a homogenous solution, after initial sample preparation in a heat block, the NMR tube was further heated in a rotary oven for at least 1 hour. Upon insertion into the magnet the tube was spun at 10 Hz. This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromolecules 30 (1997) 6251). Standard single-pulse excitation was employed utilising the NOE and bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 8192 (8 k) transients were acquired per spectra For ethylene-propylene copolymers approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 6144 (6 k) transients were acquired per spectra.

Quantitative $^{13}C\{^{1}H\}$ NMR spectra were processed, integrated and relevant quantitative properties determined from the integrals using proprietary computer programs.

For ethylene-propylene copolymers all chemical shifts were indirectly referenced to the central methylene group of the ethylene block (EEE) at 30.00 ppm using the chemical shift of the solvent. This approach allowed comparable referencing even when this structural unit was not present.

For polypropylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromolecules 30 (1997) 6251).

Specifically the influence of regio defects and comonomer on the quantification of the tacticity distribution was corrected for by subtraction of representative regio defect and comonomer integrals from the specific integral regions of the stereo sequences.

The isotacticity was determined at the pentad level and reported as the percentage of isotactic pentad (mmmm) sequences with respect to all pentad sequences:

[mmmm]%=100*(mmmm/sum of all pentads)

The presence of 2,1 erythro regio defects was indicated by the presence of the two methyl sites at 17.7 and 17.2 ppm and confirmed by other characteristic sites.

Characteristic signals corresponding to other types of regio defects were not observed (Resconi, L., Cavallo, L., Fait, A., Piemontesi, F., Chem. Rev. 2000, 100, 1253).

The amount of 2,1 erythro regio defects was quantified using the average integral of the two characteristic methyl sites at 17.7 and 17.2 ppm:

$$P_{21e}=(I_{e6}+I_{e8})/2$$

The amount of 1,2 primary inserted propene was quantified based on the methyl region with correction undertaken for sites included in this region not related to primary insertion and for primary insertion sites excluded from this region:

$$P_{12}=I_{CH3}+P_{12e}$$

The total amount of propene was quantified as the sum of primary inserted propene and all other present regio defects:

$$P_{total}=P_{12}+P_{21e}$$

The mole percent of 2,1 erythro regio defects was quantified with respect to all propene:

$$[21e] \text{mol \%}=100*(P_{21e}/P_{total})$$

For copolymers characteristic signals corresponding to the incorporation of ethylene were observed (Cheng, H. N., Macromolecules 17 (1984), 1950).

With regio defects also observed (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) correction for the influence of such defects on the comonomer content was required.

The mole fraction of ethylene in the polymer was quantified using the method of Wang et. al. (Wang, W-J., Zhu, S., Macromolecules 33 (2000), 1157) through integration of multiple signals across the whole spectral region of a $^{13}C\{^1H\}$ spectra acquired using defined conditions. This method was chosen for its accuracy, robust nature and ability to account for the presence of regio-defects when needed. Integral regions were slightly adjusted to increase applicability to a wider range of comonomer contents.

The mole percent comonomer incorporation in the polymer was calculated from the mole fraction according to:

$$E \text{ [mol \%]}=100*fE$$

The weight percent comonomer incorporation in the polymer was calculated from the mole fraction according to:

$$E \text{ [wt \%]}=100*(fE*28.05)/((fE*28.05)+((1-fE)*42.08))$$

The comonomer sequence distribution at the triad level was determined using the method of Kakugo et al. (Kakugo, M., Naito, Y., Mizunuma, K., Miyatake, T. Macromolecules 15 (1982) 1150) through integration of multiple signals across the whole spectral region of a $^{13}C\{^1H\}$ spectra acquired using defined conditions. This method was chosen for its robust nature. Integral regions were slightly adjusted to increase applicability to a wider range of comonomer contents.

The mole percent of a given comonomer triad sequence in the polymer was calculated from the mole fraction determined by the method of Kakugo et al. (Kakugo, M., Naito, Y., Mizunuma, K., Miyatake, T. Macromolecules 15 (1982) 1150) according to:

$$XXX \text{ [mol \%]}=100*fXXX$$

The mole fraction comonomer incorporation in the polymer, as determined from the comonomer sequence distribution at the triad level, were calculated from the triad distribution using known necessary relationships (Randall, J. Macromol. Sci., Rev. Macromol. Chem. Phys. 1989, C29, 201):

$$fXEX=fEEE+fPEE+fPEP$$

$$fXPX=fPPP+fEPP+fEPE$$

where PEE and EPP represents the sum of the reversible sequences PEE/EEP and EPP/PPE respectively.

The randomness of the comonomer distribution was quantified as the relative amount of isolated ethylene sequences as compared to all incorporated ethylene. The randomness was calculated from the triad sequence distribution using the relationship:

$$R(E)[\%]=100*(fPEP/fXEX)$$

Characteristic signals corresponding to the incorporation of 1-hexene were observed, and the 1-hexene content was calculated as the mole percent of 1-hexene in the polymer, H (mol %), according to:

$$[H]=H_{tot}/(P_{tot}+H_{tot})$$

where:

$$H_{tot}=I(\alpha B_4)/2+I(\alpha\alpha B_4)\times 2$$

where $I(\alpha B_4)$ is the integral of the $\alpha B_4$ sites at 44.1 ppm, which identifies the isolated 1-hexene incorporated in PPHPP sequences, and $I(\alpha\alpha B_4)$ is the integral of the $\alpha\alpha B_4$ sites at 41.6 ppm, which identifies the consecutively incorporated 1-hexene in PPHHPP sequences. $P_{tot}$=Integral of all CH3 areas on the methyl region with correction applied for underestimation of other propene units not accounted for in this region and overestimation due to other sites found in this region.

$$\text{and } H(\text{mol \%})=100\times[H]$$

which is then converted into wt % using the correlation $$H(\text{wt \%})=(100\times H \text{ mol \%}\times 84.16)/(H \text{ mol \%}\times 84.16+(100-H \text{ mol \%})\times 42.08)$$

A statistical distribution is suggested from the relationship between the content of hexene present in isolated (PPHPP) and consecutive (PPHHPP) incorporated comonomer sequences:

$$[HH]<[H]^2$$

Mw, Mn, MWD

Mw/Mn/MWD are measured by Gel Permeation Chromatography (GPC) according to the following method:

The weight average molecular weight (Mw), the number average molecular weight (Mn), and the molecular weight distribution (MWD=Mw/Mn) is measured by a method based on ISO 16014-1:2003 and ISO 16014-4:2003. A Waters Alliance GPCV 2000 instrument, equipped with refractive index detector and online viscosimeter is used with 3×TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 mL/min. 216.5 µL of sample solution are injected per analysis. The column set is calibrated using relative calibration with 19 narrow MWD polystyrene (PS) standards in the range of 0.5 kg/mol to 11 500 kg/mol and a set of well characterized broad polypropylene standards. All samples are prepared by dissolving 5 to 10 mg of polymer in 10 mL (at 160° C.) of stabilized TCB (same as mobile phase) and keeping for 3 hours with continuous shaking prior sampling in into the GPC instrument.

Molecular Weight Averages, Molecular Weight Distribution, Branching Index (Mn, Mw, MWD, g') Determined by SEC/VISC-LS Molecular weight averages (Mw, Mn), molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-4 2003. A PL 220 (Polymer Laboratories) GPC equipped with a refractive index (RI), an online four capillary bridge viscometer (PL-BV 400-HT), and a dual light scattering detector (PL-LS 15/90 light scattering detector) with a 15° and 90° angle was used. 3× Olexis and 1× Olexis Guard columns from Polymer Laboratories as stationary phase and 1,2,4-trichlorobenzene (TCB, stabilized with 250 mg/L 2,6-Di tert butyl-4-methyl-phenol) as mobile phase at 160° C. and at a constant flow rate of 1 mL/min was applied. 200 μL of sample solution were injected per analysis. The corresponding detector constants as well as the inter detector delay volumes were determined with a narrow PS standard (MWD=1.01) with a molar mass of 132900 g/mol and a viscosity of 0.4789 dl/g. The corresponding do/dc for the used PS standard in TCB is 0.053 cm³/g.

The molar mass at each elution slice was determined by light scattering using a combination of two angels 15° and 90°. All data processing and calculation was performed using the Cirrus Multi-Offline SEC-Software Version 3.2 (Polymer Laboratories a Varian inc. Company). The molecular weight was calculated using the option in the Cirrus software "use combination of LS angles" in the field "sample calculation options subfield slice MW data from".

The data processing is described in details in G. Saunders, P. A. G: Cormack, S. Graham; D. C. Sherrington, Macromolecules, 2005, 38, 6418-6422. Therein the $Mw_i$ at each slice is determined by the 90° angle by the following equation:

$$Mw_i = \frac{K_{LS} * R(\theta)^{90°}}{\frac{dn}{dc} * R * P(\theta)}$$

The Rayleigh ratio $R(\theta)^{90°}$ of the 90° angle is measured by the LS detector and R is the response of the RI-detector. The particle scatter function $P(\theta)$ is determined by the usage of both angles (15° and 90°) as described by C. Jackson and H. G. Barth (C. Jackson and H. G. Barth, "Molecular Weight Sensitive Detectors" in Handbook of Size Exclusion Chromatography and related techniques, C.-S. Wu, 2$^{nd}$ ed., Marcel Dekker, New York, 2004, p. 103). For the low and high molecular region in which less signal of the LS detector or RI detector respectively was achieved a linear fit was used to correlate the elution volume to the corresponding molecular weight.

The dn/dc used in the equation is calculated from the detector constant of the RI detector, the concentration c of the sample and the area of the detector response of the analysed sample. The relative amount of branching is determined using the g'-index of the branched polymer sample. The long chain branching (LCB) index is defined as $g'=[\eta]_{br}/[\eta]_{lin}$. It is well known if the g' value increases the branching content decreases. $[\eta]$ is the intrinsic viscosity at 160° C. in trichlorobenzene of the polymer sample at a certain molecular weight and is measured by an online viscosity and a concentration detector. The intrinsic viscosities were measured as described in the handbook of the Cirrus Multi-Offline SEC-Software Version 3.2 with use of the Solomon-Gatesman equation.

The necessary concentration of each elution slice is determined by a RI detector.

$[\eta]_{lin}$ is the intrinsic viscosity of a linear sample and $[\eta]_{br}$ the viscosity of a branched sample of the same molecular weight and chemical composition. The number average of $g'_n$ and the weight average $g'_w$ are defined as:

$$g'_n = \frac{\sum_0^i a_i * \frac{[\eta]_{br,i}}{[\eta]_{lin,i}}}{\sum a_i}$$

$$g'_w = \frac{\sum_0^i A_i * \frac{[\eta]_{br,i}}{[\eta]_{lin,i}}}{\sum_0^i A_i * \left(\frac{[\eta]_{br,i}}{[\eta]_{lin,i}}\right)^2}$$

where $a_i$ is dW/d log M of fraction i and $A_i$ is the cumulative dW/d log M of the polymer up to fraction i. The $[\eta]_{lin}$ of the linear reference (linear isotactic PP) over the molecular weight was measured with an online viscosity detector. Following K and α values were obtained (K=30.68*10$^{-3}$ and α=0.681) from the linear reference in the molecular weight range of log M=4.5-6.1. The $[\eta]_{lin}$ per slice molecular weight for the g' calculations was calculated by following relationship $[\eta]_{lin,i}=K*M_i^\alpha$. $[\eta]_{br,i}$ was measured for each particular sample by online viscosity and concentration detector.

Density is measured according to ISO 1183-187. Sample preparation is done by compression moulding in accordance with ISO 1872-2:2007.

$MFR_2$ (230° C.) is measured according to ISO 1133 (230° C., 2.16 kg load).

$MFR_2$ (190° C.) is measured according to ISO 1133 (190° C., 2.16 kg load).

Xylene Cold Soluble Fraction (XCS wt %)

The xylene cold soluble fraction (XCS) is determined at 23° C. according to ISO 6427.

Melting temperature $T_m$, crystallization temperature $T_c$, is measured with Mettler TA820 differential scanning calorimetry (DSC) on 5-10 mg samples. Both crystallization and melting curves were obtained during 10° C./min cooling and heating scans between 30° C. and 225° C. Melting and crystallization temperatures were taken as the peaks of endotherms and exotherms.

Also the melt- and crystallization enthalpy (Hm and Hc) were measured by the DSC method according to ISO 11357-3.

Tensile Modulus is measured according to ISO 527-2 (cross head speed=50 mm/min; 23° C.) using injection molded specimens as described in EN ISO 1873-2 (dog bone shape, 4 mm thickness).

Charpy impact test: The Charpy notched impact strength (Charpy NIS) is measured according to ISO 179 2C/DIN 53453 at 23° C., −20° C. and −30° C., using injection molded bar test specimens of 80×10×4 mm³ mm³ prepared in accordance with ISO 294-1:1996.

Particle size d97 is calculated from the particle size distribution as determined by laser diffraction according to ISO 13320-1:1999.

Porosity: BET with $N_2$ gas, ASTM 4641, apparatus Micromeritics Tristar 3000; sample preparation: at a temperature of 50° C., 6 hours in vacuum.

Surface area: BET with $N_2$ gas ASTM D 3663, apparatus Micromeritics Tristar 3000: sample preparation at a temperature of 50° C., 6 hours in vacuum.

Paintability Test:
Sample Preparation:

The maximum temperature of the melt was set to 240° C. The following conditions for the injection molding of test panels (80 mm×150 mm×2 mm) were used: melt temperature=240° C., mold temperature=50° C., and flow front velocity 100 mm/s.

The test panels were painted in a usual way with a standard laboratory painting process, which was composed of three consecutive steps (Power wash process, flame pre-treatment and painting process) and performed according Borealis QM work instructions (QMAA 3-430-04, available from Borealis). The panels were first purified in a simulated power wash process (pH 10, 30 bar, 30° C.). After being washed with desalinated water the panels were dried at room temperature.

A burner by Herbert Arnold GmbH (Arnold Co., Germany), with propane as the burner gas was used for the activation of the panel surface. A propane/air ratio of 25 was adjusted for the flame pretreatment. The panels were pulled ahead on a skid with 0.67 m/s and a distance from the flame of 10 cm.

A three-component paint system available from Wörwag, Germany, was applied for painting consisting of a primer, a base coat paint and a clear coat.

The primer consisted of 2 components: Wörwag 2K-Hydroprimer and Wörupur—hardener (mixing ration 100:10; drying for 15 minutes at 80° C.). As base coat paint Wörwag-Hydrobasislack Brillantsilber was used (drying for 10 minutes at 70° C. The clear coat consisted of 3 components: Wörwag—clear coat, Wöropur—hardener and Wörupur—paint thinner ($1^{st}$ mixing ratio clear coat:paint thinner=100:45; $2^{nd}$ mixture of first step:hardener=100:30; drying for 45 minutes at 80° C.).

After painting the test panels were dried for 3 days at 50° C.

Afterwards the painted test panels were scratched with an Erichsen Hand-Normritzer and a pre-fabricated scratch template as shown in Figure 1 was obtained.

Adhesion Test:

For the adhesion characterization, a vapor jet test (Daimler Dampfstrahltest DBL 5416; available for example online via DaimlerChrysler Supplier Portal or Daimler Engineering Portal) was carried out.

A steam of hot water with temperature T was directed for time t at distance d under angle α to the surface of the test panel. Pressure p was determined by the type of nozzle installed at the end of the water pipe.

The following parameters were used:

T (water)=60° C.; t=60 s; d=100 mm, α=90°, p=68 bar, nozzle type=MPEG 2506.

The adhesion level was assessed by a number between 0 (no failure to the coating) and 4 (a large area of destruction of the lacquer layer)

For each RTPO compound 5 panels (size 80 mm×150 mm×2 mm) have been tested. The panels were produced by injection moulding with 240° C. melt temperature and 50° C. mould temperature. The flow front velocity was 100 mm/s.

On each panel 5 certain points were used to judge the paintability failure in [%].
(e.g. 5 panels for each RTPO, produced at a flow front velocity of 100 mm/s, were tested, so there were 25 points in total. If 5 points failed, the failure rate was 20%)

2. Examples

Preparation of Polypropylene (PP1)

The used catalyst was prepared according to example 5 of WO 03/051934 wherein the catalyst used therein was replaced by rac-methyl(cyclohexyl)silanediyl bis(2-methyl-4-(4-tert-butylphenyl)indenyl)zirconium dichloride. Rac-methyl(cyclohexyl)silanediyl bis(2-methyl-4-(4-tert-butylphenyl)indenyl)zirconium dichloride was prepared according to WO 2005 105863 A2, examples 17-18.

Catalyst Preparation

In a jacketed 90 dm³ glasslined stainless steel reactor the complex solution was prepared at −5° C. adding 0.85 kg of a 24.5 wt % ((2,2,3,3,4,4,5,5,6,6,7,7,8,8,9,9,9-heptadecafluorononyl)oxirane)/toluene solution very slowly (3.4 ml/min) to 13.5 kg 30 wt % MAO (methylaluminoxane)/toluene solution. The temperature was increased to 25° C. and the solution was stirred for 60 minutes. After addition of 210 g of the complex solution was stirred for an additional two hours. That mixture was pumped at 5 l/h to the rotor stator with the rotor stator pair 4M. In the rotor stator with a tip speed of 4 m/s the mixture was mixed with a flow of 32 l/h of hexadecafluoro-1,3-dimethylcyclohexane thus forming an emulsion. The droplets in the emulsion were solidified by an excess flow of 450 l/h hexadecafluoro-1,3-dimethylcyclohexane at a temperature of 76° C. in a Teflon hose. The hose was connected to a jacketed 160 dm³ stainless steel reactor equipped with a helical mixing element. In this reactor the catalyst particles were separated from the hexadecafluoro-1,3-dimethylcyclohexane by density difference. After the complex solution had been utilised the catalyst particles were dried in the 160 dm³ reactor at a temperature of 70° C. and a nitrogen flow of 5 kg/h for 7 h.

Porosity and surface area below the detection limit.
mol ratio Co/M (Al/Zr): 260 mol/mol
Mean particle size: 26 μm
Zr content: 0.53 wt-%
Al content: 34.5 wt-%

IE and CE used in this invention are melt blends comprising base polymers reported in table 1. The base polymer PP 1 was produced using above mentioned catalyst in a continuous single step bulk polymerization process (loop reactor), without a gas phase polymerization step, but including the prepolymerization of the catalyst in a loop-type prepolymerization reactor. The catalyst suspension and propylene was continuously fed to the prepolymerization loop reactor which was operated at a temperature of 25° C. and a pressure of 50 bar. The residence time in the prepolymerization was between 15 and 30 minutes. Hydrogen feed (g/h) was adjusted to reach the desired MFR (Table 1). The same hydrogen feed was used in the prepolymerization and the loop reactor. The temperature and pressure in the loop reactor were 75° C. and 55 bar respectively. The PP1 shown in table 1 was collected after the loop reactor.

TABLE 1

Properties of the polypropylene (PP)

|  |  | PP 1 | PP 2 |
|---|---|---|---|
| MW | [kg/mol] | 217 | 450 |
| MWD | [—] | 3.0 | 5.0 |
| MFR$_2$ | [g/10 min] | 3.1 | 4.0 |
| XCS | [wt.-%] | 0.3 | 1.5 |
| XHI | [wt.-%] | 0 | 0 |
| Tm | [° C.] | 152 | 163 |
| Tc | [° C.] | 109 | 125 |
| g' | [—] | >0.9 | 0 |
| TM | [MPa] | 1758 | 1937 |
| mmmm | [mol.-%] | 99 | 98 |
| <2, 1> | [mol-%] | 0.9 | 0.0 |

<2, 1> are the <2, 1> regiodefects
PP 2 is the commercial product HC205TF of Borealis AG

TABLE 2

Properties of the heterophasic polypropylene compositions

|  |  | IE | CE |
|---|---|---|---|
| Components* |  |  |  |
| PP1 | [wt.-%] | 57.5 | — |
| PP2 | [wt.-%] | — | 57.5 |

TABLE 2-continued

Properties of the heterophasic polypropylene compositions

|  |  | IE | CE |
|---|---|---|---|
| EC2 | [wt.-%] | 25.0 | 25.0 |
| Talc | [wt.-%] | 15.0 | 15.0 |
| Property |  |  |  |
| MFR$_2$ | [g/10 min] | 4.62 | 5.60 |
| PT | [%] | 8 | 36 |

*Remaining part to 100 wt.-% are additives, like antioxidants
TM Tensile modulus
PT Paintability failure EC2 is the commercial product Engage 7447 of Dow, which is a ethylene-butene copolymer, with a density of 0.865 g/cm$^3$ and a melt flow rate MFR$_2$ (190° C.) of 5.0 g/10 min. Talc is the commercial product Jetfine 3CA of Luzenac having a BET of 14.5 m$^2$/g and a particle size (d95%) of 7.8 µm

The invention claimed is:

1. Exterior automotive article comprising a composition (C), said composition comprises a polypropylene (PP), an elastomeric copolymer (EC), and a mineral filler (F), wherein:
   (a) said polypropylene (PP) has
      (a1) a comonomer content of equal or below 1.0 wt. %, the comonomers are ethylene and/or at least one C$_4$ to C$_{20}$ α-olefin, and
      (a2) <2,1> erythro regiodefects of equal or more than 0.4 mol. % determined by $^{13}$C-NMR spectroscopy,
   (b) said elastomeric copolymer (EC) comprises units derived from
      (b1) ethylene, and
      (b2) at least one C$_3$ to C$_{10}$ α-olefin,
   (c) said composition (C) has a melt flow rate MFR$_2$ (230° C.) measured according to ISO 1133 in the range of 1 to 80 g/10 min.

2. Exterior automotive article according to claim 1, wherein the polypropylene (PP) has:
   (a) a melting temperature (T$_m$) measured by differential scanning calorimetry (DSC) in the range of 150 to 158° C., and/or
   (b) a crystallization temperature (T$_c$) measured by differential scanning calorimetry (DSC) of at least 100° C.

3. Exterior automotive article according to claim 1, wherein the polypropylene (PP) has:
   (a) a pentad isotacticity <mmmm> of at least 98 mol. %, and/or
   (b) a branching index g' of at least 0.9.

4. Exterior automotive article according to claim 1, wherein the polypropylene (PP) has:
   (a) a molecular weight distribution (MWD) measured according to ISO 16014 of at least 2.0, and/or
   (b) a melt flow rate MFR$_2$ (230° C.) measured according to ISO 1133 of more than 1.0 g/10 min, and/or
   (c) a xylene cold soluble fraction (XCS) determined at 23° C. according ISO 6427 of equal or below 1.0 wt. %.

5. Exterior automotive article according to claim 1, wherein:
   (a) the elastomeric copolymer (EC) and the filler (F) are dispersed in said polypropylene (PP), and/or
   (b) the composition (C) has/have a xylene soluble (XS) content of at least 12 wt.-% based on the total composition (C).

6. Exterior automotive article according to claim 1, wherein the composition (C) comprises:
   (a) 36 to 85 wt. % of the polypropylene(PP),
   (b) 10 to 72 wt. % of elastomeric copolymer (EC), and
   (c) 5 to 20 wt. % of the inorganic filler (F).

7. Exterior automotive article according to claim 1, wherein the elastomeric copolymer (EC) is:
   (a) a first elastomeric copolymer (EC1) comprising units derived from ethylene in an amount of 20 to 70 wt. %, or
   (b) a second elastomeric copolymer (EC2) comprising units derived from ethylene in an amount of more than 50 wt. %, or
   (c) an mixture of the first elastomeric copolymer (EC1) and the second elastomeric copolymer (EC2), wherein the first elastomeric copolymer (EC1) and the second elastomeric copolymer (EC2) are chemically different.

8. Exterior automotive article according to claim 1, wherein the polypropylene(PP), the elastomeric copolymer (EC) and the filler (F) constitute together equal or more than 80 wt. % of the composition (C).

9. Exterior automotive article according to claim 1, wherein the composition (C) constitutes equal or more than 80 wt. % of the exterior automotive article.

10. Exterior automotive article according to claim 1, wherein the exterior automotive article is an injection molded article.

11. Exterior automotive article according to claim 1, wherein the exterior automotive article is selected from the group consisting of bumpers, side trims, step assists, body panels, and spoilers.

12. A method of reducing paintability failure of a molded article; the method comprising: providing a molded article that includes a polypropylene (PP) having:
   (a1) a comonomer content of equal or below 1.0 wt. %, the comonomers are ethylene and/or at least one C$_4$ to C$_{20}$ α-olefin, and
   (a2) <2,1> erythro regiodefects of equal or more than 0.4 mol. % determined by $^{13}$C-NMR spectroscopy.

13. The method according to claim 12, wherein:
   (A) the polypropylene (PP) is part of the molded article, and/or
   (B) the polypropylene (PP) is the molded article and comprises a composition (C), said composition comprises a polypropylene (PP), an elastomeric copolymer (EC), and a mineral filler (F), wherein:
      (a) said polypropylene (PP) has
         (a1) a comonomer content of equal or below 1.0 wt. %, the comonomers are ethylene and/or at least one C$_4$ to C$_{20}$ α-olefin, and
         (a2) <2,1> erythro regiodefects of equal or more than 0.4 mol. % determined by $^{13}$C-NMR spectroscopy,
      (b) said elastomeric copolymer (EC) comprises units derived from
         (b1) ethylene, and
         (b2) at least one C$_3$ to C$_{10}$ α-olefin
      (C) said composition (C) has a melt flow rate MFR$_2$ (230° C.) measured according to ISO 1133 in the range of 1 to 80 g/10 min.

14. The method of according to claim 12, wherein:
   (A) the polypropylene has:
      (a) a melting temperature (T$_m$) measured by differential scanning calorimetry (DSC) in the range of 150 to 158° C., and/or
      (b) a crystallization temperature (T$_c$) measured by differential scanning calorimetry (DSC) of at least 100° C., and/or
   (B) the molded article is an exterior automotive article comprising a composition (C), said composition comprises a polypropylene (PP), an elastomeric copolymer (EC), and a mineral filler (F), wherein:

(a) said polypropylene (PP) has
- (a1) a comonomer content of equal or below 1.0 wt. %, the comonomers are ethylene and/or at least one $C_4$ to $C_{20}$ α-olefin, and
- (a2) <2,1> erythro regiodefects of equal or more than 0.4 mol. % determined by $^{13}C$-NMR spectroscopy, (C) said elastomeric copolymer (EC) comprises units derived from
- (b1) ethylene, and
- (b2) at least one $C_3$ to $C_{10}$ α-olefin (D) said composition (C) has a melt flow rate $MFR_2$ (230° C.) measured according to ISO 1133 in the range of 1 to 80 g/10 min.

15. The method of claim 12, keeping the paintability failure of the exterior automotive article equal or below 35%.

* * * * *